United States Patent [19]

Dueber et al.

[11] Patent Number: 5,356,943
[45] Date of Patent: Oct. 18, 1994

[54] RIGID FOAMS

[75] Inventors: Ernst O. Dueber, Tervuren; Berend Eling, Wezembeek-Oppem, both of Belgium

[73] Assignee: Imperial Chemical Industries PLC, London, England

[21] Appl. No.: 414,569

[22] Filed: Sep. 29, 1989

Related U.S. Application Data

[63] Continuation of Ser. No. 196,400, May 19, 1988, abandoned.

[51] Int. Cl.$^5$ ............................................. C08G 18/00
[52] U.S. Cl. ................................. 521/124; 521/125; 521/128; 521/160; 528/67; 252/182.21
[58] Field of Search ............... 521/124, 125, 128, 160; 528/67; 252/182.21

[56] References Cited

U.S. PATENT DOCUMENTS

| | | | |
|---|---|---|---|
| 3,936,483 | 2/1976 | Gemeinhardt | 260/453 AR |
| 4,200,699 | 4/1980 | Treadwell | 521/112 |
| 4,256,847 | 3/1981 | Specter | 521/112 |
| 4,362,678 | 12/1982 | Skowronski et al. | 264/46.3 |
| 4,405,725 | 9/1983 | Bernard et al. | 521/112 |
| 4,555,418 | 11/1985 | Snider et al. | 427/373 |
| 4,623,673 | 11/1986 | DeGieuseppi et al. | 521/110 |
| 4,711,912 | 12/1987 | Snider et al. | 521/125 |

FOREIGN PATENT DOCUMENTS

| | | |
|---|---|---|
| 0010407 | 4/1980 | European Pat. Off. |
| 3245678 | 6/1987 | Fed. Rep. of Germany |
| 1433641 | 4/1976 | United Kingdom |
| 2041953 | 9/1980 | United Kingdom |

*Primary Examiner*—Maurice J. Welsh

[57] ABSTRACT

RIGID FOAMS, in particular, polyisocyanurate and polyurethene foams having improved fire and surface properties can be prepared by reacting a polymethylene polyphenyl polyisocyanate composition with a polyfunctional active hydrogen compound under foam-forming conditions, the polyisocyanate composition containing not more than 20% by weight of dyisocyanates and not more than 20% by weight of polyisocyanates containing more than 5 isocyanate groups per molecule.

19 Claims, No Drawings

RIGID FOAMS

This is a continuation, of co-pending application Ser. No. 07/196,400 filed on May 19, 1988 or now abandoned.

This invention relates to rigid foams and especially to rigid polymeric foams derived from certain polymethylene polyphenyl polyisocyanate compositions.

Polymethylene polyphenyl polyisocyanate compositions are manufactured industrially by phosgenating mixtures of polyamines obtained by the acid condensation of aniline and formaldehyde. The polyisocyanate mixtures that have achieved greatest commercial importance have contained from about 30% to about 70% by weight of diphenylmethane diisocyanate together with various amounts of related methylene-bridged polyphenylene tri- to penta- and higher polyisocyanates, the actual compositions being largely dependent upon the initial aniline/formaldehyde ratio.

Such compositions have been used in isocyanate-based formulations of many types and especially in the production of polyurethane and polyisocyanurate rigid foams as described, for example, in United Kingdom Patent specifications 848671, 874430, 1146661, 1184893 and 1223415.

It has now been found that superior rigid foams can be made from polymethylene polyphenyl polyisocyanate mixtures having reduced contents of diisocyanates and higher molecular weight polyisocyanates and correspondingly increased contents of tri- to penta-isocyanates. In particular, it has been found that polyisocyanurate foams having improved fire properties, as measured by the oxygen index, and polyurethane foams having enhanced surface properties, especially lower surface friability, may be prepared from said mixtures.

Accordingly, the invention provides a method for the preparation of rigid foams comprising reacting a polymethlene polyphenyl polyisocyanate composition with a polyfunctional active hydrogen compound under foam-forming conditions, the polyisocyanate composition containing not more than 20% by weight of diisocyanates and not more than 20% by weight of polyisocyanates containing more than 5 isocyanate groups per molecule.

Typical polyisocyanate compositions for use in the method of the invention contain:
0–20% diphenylmethane diisocyanates
0–80% dimethylene triphenylene triisocyanates
5–25% polymethylene polyphenylene tetra- and pentaisocyanates and
0–20% higher polymethylene polyphenylene polyisocyanates
on a weight basis.

Preferred polyisocyanate compositions for use in the method of the invention have a NCO-value ranging from 32–33.3 percent by weight, which constitute novel compositions which are also the specific subject matter of this invention.

It is preferred that the diisocyanate content of the polyisocyanate composition is less than 15% by weight. It is also preferred that the content of polyisocyanates having 6 or more NCO-groups is less than 10% by weight. Suitable compositions preferably have viscosities of less than 1000 centipoises at 25 Deg. C.

Polyisocyanate mixtures which may be used in accordance with the invention and methods for their preparation have been described in the prior art, for example in DE-OS 3245678 and EP 133538. In general, the mixtures are prepared by solvent extraction processes performed upon the original polymethylene polyphenyl polyamine mixtures before phosgenation or upon the corresponding polymethylene polyphenyl polyisocyanates. Any excess diisocyanate can then be removed by distillation.

In particular, DE 3245678 describes a method to obtain a polyisocyanate composition by phosgenating a polyamine fraction which comprises at least 94% by weight of triamines. The polyamine fraction is obtained upon fractional distillation of a mixture containing di- and polyphenylene polymethylene polyamines- which results from acid condensation of aniline and formaldehyde.

Polyfunctional active hydrogen compounds which may be used in the method of the invention include polyols, polyamines and water which, respectively, react with polyisocyanates forming polyurethane and polyurea products. The polyisocyanate may be reacted with the active hydrogen compounds in approximately stoichiometric quantities (NCO index 100) or, alternatively, higher NCO indices, for example 500 or 1000 or even higher, may be employed together with trimerisation catalysts so as to form polyisocyanurate modified products.

Useful polyols and polyamines include the conventional materials used or proposed to be used in the manufacture of polyurethane, polyurea and polyisocyanurate rigid foams.

Suitable polyols generally have two or more hydroxyl groups and molecular weights of from 62 to 1500, the functionality and molecular weight appropriate to either polyurethane or polyisocyanurate foams being selected in known manner. Examples of such polyols include ethylene glycol, glycerol, trimethylolpropane, triethanolamine and their lower molecular weight oxyalkylation products. Alkanolamines such as monoethanol amine might also be used. Other useful polyols include the lower molecular weight oxyalkylation products of sorbitol, sucrose and aromatic polyamines such as tolylene diamine and polymethylene polyphenyl polyamines as well as bis-phenols and polyether and polyester polyols.

Suitable polyamines generally have two or more primary or secondary amino groups and molecular weights of from 60 to 1500.

Mixtures of polyols and/or polyamines and/or water may be used.

The polyisocyanate composition and the polyfunctional active hydrogen compound may be reacted under conventional foam-forming conditions. In general, this involves preparing a reaction mixture containing a blowing agent in addition to the polyisocyanate and active hydrogen compound.

Such reaction mixtures may also contain other conventional ingredients, for example catalysts, surfactants, flame retardants and trimerisation catalysts.

Suitable blowing agents include inert volatile liquids, especially halogenated alkanes such as trichlorofluoromethane and dichlorodifluoromethane. In some cases, water can be employed as a blowing agent in addition to, or instead of, the inert liquid.

Surfactants useful in foam preparation include siloxaneoxyalkylene copolymers and conventional non-ionic surfactants. Catalysts useful in the preparation of polyurethane and polyurea foams include the usual tertiary amines and tin compounds whilst trimerisation catalysts required for polyisocyanurate foams include alkali metal and alkaline earth metal hydroxides, alkoxides and alkanoates. Particularly useful catalysts for the production of polyisocyanurate foams include mixtures of a salt of the formula:

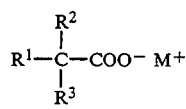

and a salt of the formula:

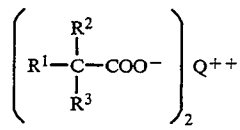

wherein M represents an alkali metal or tetraalkylammonium, Q represents a group IIA metal or zinc and $R^1$, $R^2$ and $R^3$, which may be the same or different, represent hydrogen, lower alkyl, cycloalkyl, phenyl or alkylphenyl.

Such catalysts are in particular preferred when the isocyanate index is higher than 500. The foams may be prepared using any of the conventional mixing and fabrication techniques. Thus, spraying techniques or moulding or lamination processes may be used as desired. The reduced surface friability of the polyurethane foams is particularly valuable in lamination processes inasmuch as the adhesion between the foam and the facing materials is significantly improved.

The invention is illustrated but not limited by the following examples in which all parts are by weight.

EXAMPLE 1

Two polyurethane foams were made from the following formulations:

| | | |
|---|---|---|
| Oxypropylated glycerol (OH = 540) | 38.1 | 36.8 |
| Silicone fluid DC-193 (DOW Chemical) | 0.5 | 0.5 |
| N,N-Dimethylcyclohexylamine | 1.0 | 1.0 |
| Dibutyltin dilaurate | 0.015 | 0.015 |
| Trichlorofluoromethane | 13.0 | 13.0 |
| Polyisocyanate 1 | 47.4 | — |
| Polyisocyanate 2 | — | 48.7 |

Polyisocyanate 1 was a polymethylene polyphenyl polyisocyanate composition having an NCO value of 33.0 and containing 16% by weight of diisocyanate and 6% by weight of polyisocyanates having a molecular weight higher than 650.

Polyisocyante 2 was a conventional polymethylene polyphenyl polyisocyanate composition having an NCO value of 30.6 and containing 50% by weight of diisocyanate. It was shown by tactile examination that the surface friability of foam 1 was less than that of foam 2.

EXAMPLE 2

Polyisocyanurate foams were prepared from the following formulations:

| | A | B | C |
|---|---|---|---|
| Polypropylene glycol 425 | 18.9 | 12.7 | 7.90 |
| Silicone fluid DC-193 (DOW Chemical) | 0.35 | 0.35 | 0.35 |
| Potassium acetate (50% ethylene glycol solution) | 0.45 | 0.30 | 0.30 |
| N,N-dimethylcyclohexylamine | 1.00 | 0.30 | 0.30 |
| Trichlorofluoromethane | 10.00 | 10.00 | 10.00 |
| Polyisocyanate 1 | 69.9 | 77.5 | 88.1 |

Three corresponding foams were then prepared from the same formulations except that Polyisocyanate 1 was replaced by Polyisocyanate 2 (as in Example 1). The six rigid polyisocyanurate foams so obtained were subjected to the Oxygen Index test (ASTM 2863) giving the following results:

| | A | B | C |
|---|---|---|---|
| Polyisocyanate 2 | 23.4 | 25.0 | 27.0 |
| Polyisocyanate 1 (as in Example 1) | 23.8 | 25.7 | 28.0 |

I claim:

1. A method for the preparation of rigid foams comprising reacting a polymethylene polyphenyl polyisocyanate composition with a polyfunctional active hydrogen compound under foam-forming conditions, the polyisocyanate composition containing not more than 20% by weight of diisocyanates and not more than 20% by weight of polyisocyanates containing more than 5 isocyanate groups per molecule, the remainder of said polyisocyanate composition comprising polyisocyanates selected from the group consisting of tri-, tetra-, and penta-isocyanates.

2. A method according to claim 1 wherein the polyisocyanate composition contains 0–20% diphenylmethane diisocyanates, 40–80% dimethylene triphenylene triisocyanates, 5–25% polymethylene polyphenylene tetra- and penta-isocyanates and 0–20% higher polymethylene polyphenylene polyisocyanates on a weight basis.

3. A method according to claim 1 wherein the NCO content of the polyisocyanate composition is from 32% to 33.3% by weight.

4. A method according to claim 1 wherein the polyisocyanate composition contains less than 15% by weight of diisocyanates.

5. A method according to claim 1 wherein the polyisocyanate composition contains less than 10% by weight of polyisocyanates containing more than 5 isocyanate groups per molecule.

6. A method according to claim 1 wherein the polyisocyanate composition has a viscosity of less than 1000 centipoises at 25 Deg. C.

7. A method according to claim 1 wherein the polyfunctional active hydrogen compound is a polyol, a polyamine, water or mixtures of one or more of these.

8. A method according to claim 1 wherein the polyisocyanate composition is used in a great r than stoichiometric amount together with a trimerisation catalyst.

9. A method according to claim 8 wherein the catalyst comprises a mixture of a salt of the formula:

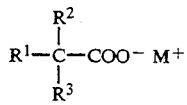

and a salt of the formula:

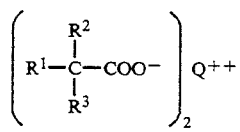

wherein M represents an alkali metal or tetraalkyammonium, Q represents a group IIA metal or zinc and $R^1$, $R^2$ and $R^3$, which may be the same or different, represent hydrogen, lower alkyl, cycloalkyl, phenyl or alkylphenyl.

10. A method according to claim 9 wherein the NCO index is higher than 500.

11. A polyisocyanate composition characterized by
a diisocyanate content of from 0 to 20 wt %
a triisocyanate content of from 40 to 80 wt %
a tetra/pentaisocyanate content of from 5 to 25 wt %
and a polyisocyanate content of not more than 20 wt % and wherein the NCO value is from 32 to 33.3 wt %.

12. A polyisocyanate composition according to claim 11, wherein there is less than 15% by wt of diisocyanate.

13. A polyisocyanate composition according to claim 11 wherein there is less than 10% by wt of polyisocyanate containing more than 5 isocyanate groups per molecule.

14. A polyisocyanate composition according to claim 11, having a viscosity of less than 1000 centipoises at 25° C.

15. A method according to claim 2 wherein the -NCO content of the polyisocyanate composition is from 32%–33.3% by weight.

16. A method according to claim 2 wherein the polyisocyanate composition contains less than 15% of dyisocyanates.

17. A polyisocyanate composition according to claim 12 wherein there is less than 10% by weight a polyisocyanate containing more than 5 isocyanate groups per molecule.

18. A polyisocyanate composition according to claim 12 having a viscosity of less than 1000 centipoises at 25° C.

19. A polyisocyanate composition according to claim 13 having a viscosity of less than 1000 centipoises at 25° C.

* * * * *